(12) United States Patent
Park et al.

(10) Patent No.: US 8,532,170 B2
(45) Date of Patent: Sep. 10, 2013

(54) ENHANCED PRESENTATION OF SUB-PICTURE INFORMATION

(75) Inventors: Yong-Gab Park, Santa Clara, CA (US); John E. Crosbie, Fremont, CA (US); Shrikant Acharya, Fremont, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 1722 days.

(21) Appl. No.: 11/846,836

(22) Filed: Aug. 29, 2007

(65) Prior Publication Data

US 2009/0060026 A1 Mar. 5, 2009

(51) Int. Cl.
*H04N 7/12* (2006.01)
*H04N 11/02* (2006.01)
*H04N 11/04* (2006.01)

(52) U.S. Cl.
USPC ............... 375/240.01; 375/240.25; 382/254; 382/260; 382/261; 382/262; 382/263; 382/264; 382/265

(58) Field of Classification Search
USPC ........ 375/240.01, 240.25; 382/254, 260–265
See application file for complete search history.

(56) References Cited

U.S. PATENT DOCUMENTS

| | | | | |
|---|---|---|---|---|
| 4,989,097 A * | 1/1991 | Yoshio et al. | ................. | 386/246 |
| 5,715,334 A * | 2/1998 | Peters | ........................... | 382/254 |
| 5,854,859 A * | 12/1998 | Sobol | ........................... | 382/261 |
| 6,253,025 B1 * | 6/2001 | Kitamura et al. | ............ | 386/351 |
| 6,384,839 B1 * | 5/2002 | Paul | ............................. | 345/613 |
| 6,803,968 B1 * | 10/2004 | Numata | ........................ | 348/584 |
| 7,239,327 B2 * | 7/2007 | Silverstein | ................... | 345/613 |
| 7,728,851 B2 * | 6/2010 | Kuno | ........................... | 345/629 |
| 7,864,202 B2 * | 1/2011 | Brown Elliott et al. | ...... | 345/694 |
| 2003/0085906 A1 * | 5/2003 | Elliott et al. | .................. | 345/613 |
| 2003/0086698 A1 * | 5/2003 | Maertens | ....................... | 386/95 |
| 2004/0146111 A1 * | 7/2004 | Dutey et al. | ............. | 375/240.25 |
| 2004/0151398 A1 * | 8/2004 | Betrisey et al. | ............... | 382/260 |
| 2005/0083348 A1 * | 4/2005 | Brown et al. | ................. | 345/613 |
| 2006/0114258 A1 * | 6/2006 | Stamm et al. | ................ | 345/469 |
| 2006/0269227 A1 * | 11/2006 | Hsieh | ............................. | 386/95 |
| 2007/0245389 A1 * | 10/2007 | Kuno | ............................. | 725/89 |
| 2008/0199099 A1 * | 8/2008 | Michel et al. | ................ | 382/260 |
| 2008/0239152 A1 * | 10/2008 | Masuo | ........................... | 348/600 |

OTHER PUBLICATIONS

CinePlayer™ DVD Decoder Pack for Windows® XP; Sonic Solutions website http://www.sonic.com; Jan. 2, 2008.

* cited by examiner

*Primary Examiner* — Edan Orgad
*Assistant Examiner* — Kari Schmidt
(74) *Attorney, Agent, or Firm* — Brooks Kushman P.C.

(57) ABSTRACT

A system is provided for processing video images for display. In one example, the system comprises a stream parser for retrieving a compressed main video data and a sub-picture identifier. A video decoder generates a main video image having a main video intensity value for each pixel in the main video. A sub-picture decoder determines a sub-picture image based on the sub-picture identifier. The sub-picture image includes a pixel data for each pixel in the sub-picture image indicative of a sub-picture pixel type including a background pixel type and a pattern pixel type. Each pixel includes a command code indicative of a background contrast level, a pattern contrast level, a background color level and a pattern color level. An intensity formatter generates a sub-picture pixel intensity for each pixel in the sub-picture image. A preprocessing function calculates, for each sub-picture pixel, a sub-picture pixel intensity by alpha-blending the sub-picture pixel with no main video pixel when the background color intensity is greater than the pattern color intensity. A filtering function performs anti-aliasing filtering on the sub-picture image. A sub-picture alpha-blending function combines the sub-picture image with the main video image using alpha-blending.

16 Claims, 7 Drawing Sheets

ENHANCED PRESENTATION OF SUB-PICTURE INFORMATION

FIELD OF THE INVENTION

The invention relates generally to image data processing, and more particularly, to systems and methods for processing sub-picture image data in media streams.

BACKGROUND

Media storage devices (such as DVDs) for storing video may include additional video data intended to be displayed on top of, or over, the main video data. This additional video data is known as "sub-picture" information and may include menus, sub-titles, Karaoke, simple animation, etc. Sub-picture information may be stored separately from the main video and audio data, as it may or may not be displayed depending on the user's choice.

It is generally preferred that sub-picture information take up as little memory space as possible in the media, and consume as little of the system's memory and processor resources as possible. Typical DVDs support up to 32 separate sub-picture data streams, any one stream being limited to 3.36 Mbps bandwidth (video bit rate is 9.8 Mbps or less). To meet this bandwidth requirement, and to simplify sub-picture decoding, sub-pictures are composed with run length encoded bitmaps. Each pixel in the decoded sub-picture image is assigned a value from a fixed YUV palette of 16, each entry having a 4 byte color value. Run length coding ("RLC") permits runs of data, or, consecutive instances of a data value, to be represented as a single data value and a run count rather than as the original string of data values in the run. RLC is particularly useful on image data that contains many such runs, such as for example, line drawings, simple graphic images, icons, etc.

The visual quality of sub-picture images may depend on display resolutions. Sub-picture is decoded and then combined with the main video for display on a computer monitor or television. The combination of sub-picture information and main video may typically be performed using a process called "alpha-blending." Alpha-blending may be done in the YUV420 domain and using only intensity, luma, or all components. One problem associated with typical methods for displaying sub-picture information is similar to an effect that occurs when displaying analog data that is represented in a digital system. This effect, known as "aliasing" may make a line at an angle appear with jagged edges or blocky patterns. Detail in the analog signal that is between the discrete digital values (quantization) may not be displayed causing the image to have the jagged staircase appearance. Similarly, sub-pictures may produce aliasing effects when displayed on a screen having a higher resolution.

In order to reduce the visual effect of aliasing, the sub-picture data may be processed with an anti-aliasing filter, or a low-pass filter ("LPF"). When the sub-picture is combined, during a process known as "alpha-blending," with the main video after anti-aliasing, undesired artifacts may appear at the dark to light color transitions in the sub-picture image. These artifacts may appear as bright spots in the dark background.

It would be desirable to eliminate the undesired anti-aliasing effects when sub-picture images are blended with main video images.

SUMMARY

In view of the above, an example system is provided for processing video images for display. The example system comprises a compressed video data file with sub-picture data, a stream parser for processing the main video compressed data file and a sub-picture identifier. A video decoder generates a main video image having a main video intensity value for each pixel in the compressed main video data. A sub-picture decoder determines a sub-picture image based on the sub-picture identifier. The sub-picture image includes pixel data for each pixel in the sub-picture image indicative of a sub-picture pixel type. In one example, the sub-picture pixel type includes at least a background pixel type and a pattern pixel type. Each pixel includes a command code indicative of a contrast and a color for each pixel type. In one example, the command code is indicative of at least a background contrast level, a pattern contrast level, a background color value and a pattern color value. The system includes an intensity formatter to generate a sub-picture pixel intensity for each pixel in the sub-picture image. A preprocessing function calculates, for each sub-picture pixel, an adjusted sub-picture pixel intensity by performing a set contrast command function with no main video when the color intensity for a first pixel type is greater than the color intensity of a second pixel type. In one example, the preprocessing function performs the alpha-blending when the color intensity of the background pixel type is greater than the color intensity of the pattern pixel type. A filtering function is included to perform anti-aliasing filtering on the sub-picture image. A sub-picture alpha-blending function combines the sub-picture image with the main video image using alpha-blending.

Further, in view of the above, an example method is provided for processing a sub-picture image. In the example method, a main video image is generated. A selected sub-picture image is decoded to include pixel data and a display control command for each sub-picture pixel. The pixel data is indicative of at least two sub-picture pixel types, which in one example includes a background pixel type and a pattern pixel type. A sub-picture intensity value is determined for each pixel using the pixel data and the display control command. A preprocessing function is performed for each sub-picture pixel. In the preprocessing function, an adjusted sub-picture pixel intensity is calculated using a first pixel type color intensity and a second pixel type color intensity. The first pixel type color intensity is compared with the second pixel type color intensity; and if the first pixel color intensity is greater than the second pixel type color intensity, the sub-picture intensity is determined by performing an alpha-blending process on the sub-picture pixel but excluding the main video pixel. The sub-picture pixels are anti-aliasing filtered and combined with the main video image using alpha-blending to generate an alpha-blended video image containing the sub-picture image.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

In the following description of examples of implementations, reference is made to the accompanying drawings that form a part hereof, and which show, by way of illustration, specific implementations in which the invention may be practiced. Other implementations may be utilized and structural changes may be made without departing from the scope of the invention.

Figure 1:
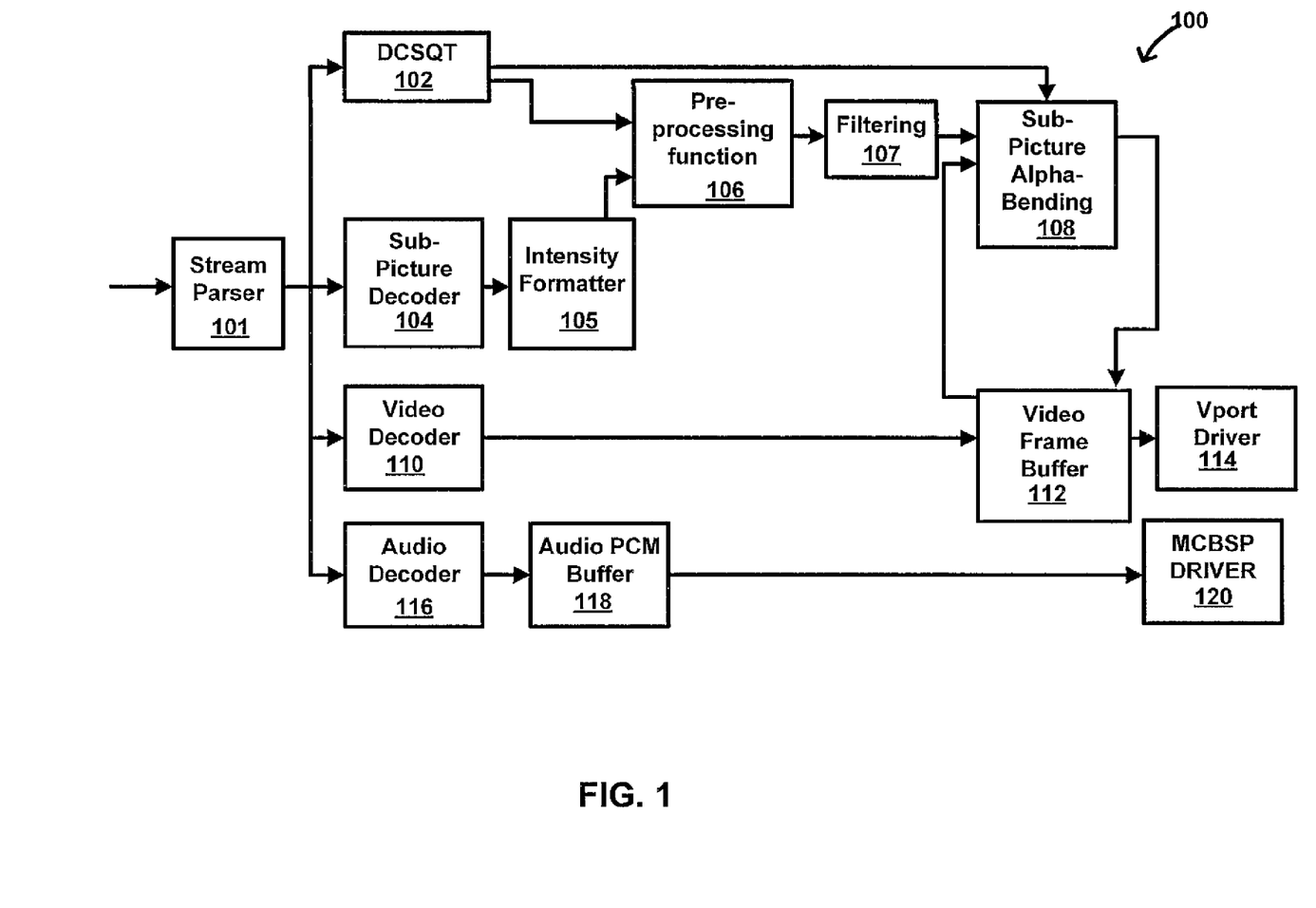
FIG. 1 is a block diagram of an example system for processing audio and video data that may include sub-picture image data.

FIG. 1 is a block diagram of an example system for processing audio and video data that may include sub-picture image data. The example system 100 in FIG. 1 is described below in the context of a system for decoding audio and video of a DVD video disk having sub-picture data according to "DVD Specifications for Read-Only Disc, Part 3, VIDEO SPECIFICATIONS, Version 1.13, Mar. 2002." A DVD video disk may contain, for example, a movie stored as compressed audio and video data and features such as sub-titles stored as image data. The movie image data may be stored separate from the features image data to allow a user to select features to display at playback. When the movie is played, the movie video data may be mixed with the sub-picture data according to the user's selection. The movie video data is an example of main video image data as described below. However, those of ordinary skill in the art will appreciate that examples may be implemented in any suitable system using a sub-picture decoding scheme.

The example system 100 in FIG. 1 includes a stream parser 101, which analyzes a DVD video stream and parses out streams of sub-picture information, main video information and audio information. The sub-picture information may be processed using a display control sequence table ("DCSQT") 102, a sub-picture decoder 104, an intensity (YUV) formatter 105, a preprocessing function 106, a filtering function 107, and a sub-picture alpha-blending function 108. The video information stream may be processed using a video decoder 110 and a video frame buffer 112. The video frame buffer 112 may be used to combine the main video image with the sub-picture image. The combined sub-picture/main video image is then output at the video port ("Vport") driver 114 for display. The audio information stream may be processed using an audio decoder 116 and an audio pulse code modulation ("PCM") buffer 118. The audio data is output at a multi-channel buffer serial port ("MCBSP") driver 120.

The example system 100 decodes DVD media packets according to the DVD specifications. The DVD data is received as a pack of video, audio and sub-picture information. The stream parser 101 extracts the packets in the DVD pack for processing according to the standard that defines each type of packet. The video packets may be decoded by the video decoder 110 according to the MPEG-1 or MPEG-2 standards. The audio packets may be decoded by the audio decoder 116 according to any of the Linear PCM, Dolby AC-3, MPEG audio DTS or SDDS standards.

With respect to the sub-picture data, the stream parser 101 may extract a sub-picture stream ID from the DVD pack. The stream parser 101 may then select the sub-picture data associated with the sub-picture stream ID and store the sub-picture data in a sub-picture buffer for decoding. The sub-picture data may be formatted as a sub-picture unit 200 as shown, for example, in FIG. 2.

Figure 2:
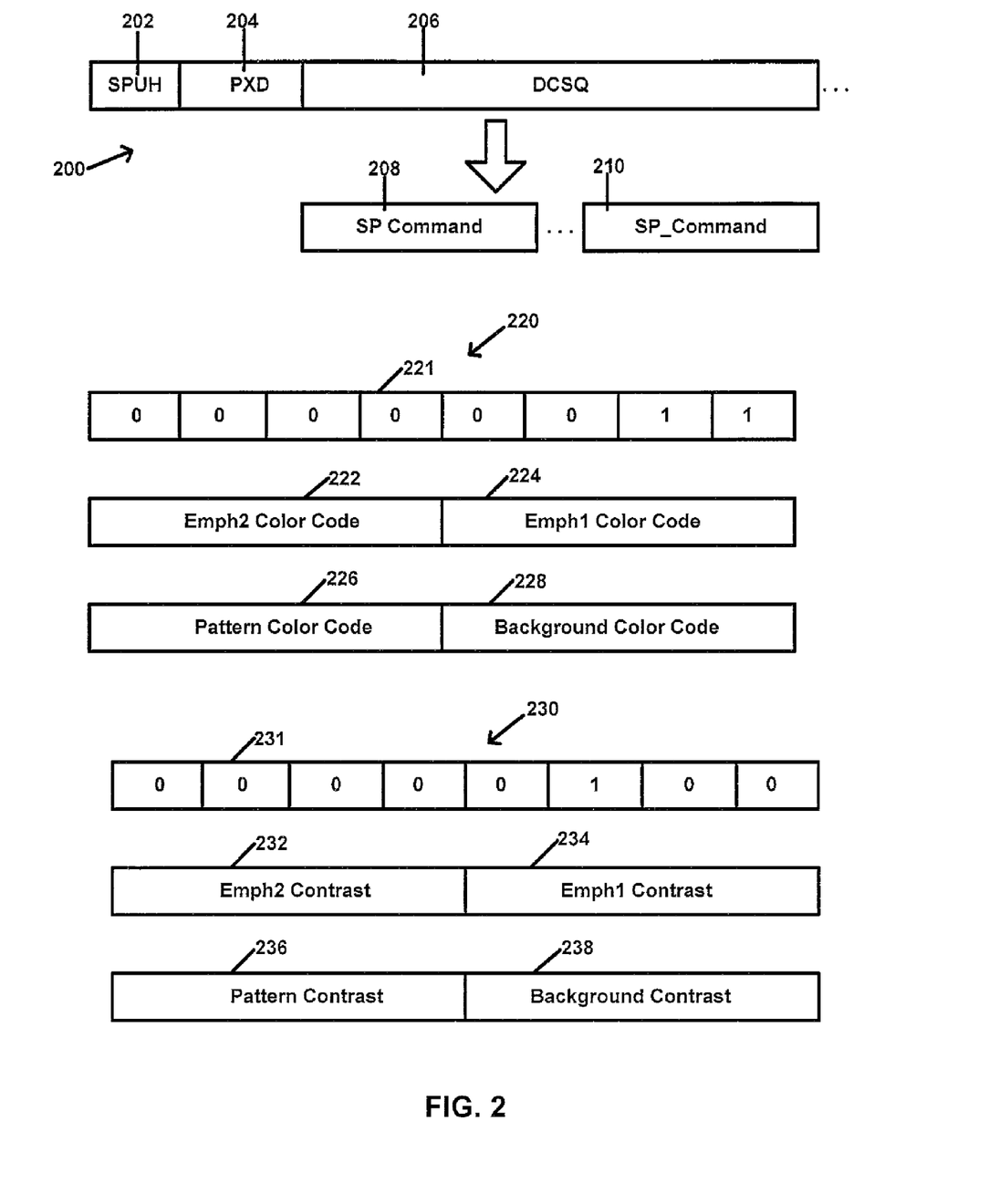
FIG. 2 depicts an example data format of a sub-picture unit in a DVD data pack that may be processed using the example system in FIG. 1.

FIG. 2 depicts an example data format of a sub-picture unit in a DVD data pack that may be processed using the example system in FIG. 1. The sub-picture unit 200 may include a header ("SPUH") 202, a pixel data ("PXD") 204 portion, and a display control sequence ("DCSQ") 206. The header 202 may include data used by the sub-picture decoder 104 to decode the sub-picture unit 200. For example, the sub-picture header 202 may include a sub-picture unit size and the start address of the DCSQT, which contains the control information used to display the sub-picture.

The PXD portion 204 may include data indicative of a bitmap of an image that conveys information intended to be conveyed by the sub-picture image. The PXD portion 204 may be information encoded from the bitmap data in each line by specific run length compression rule. Each pixel may be decoded as a 2-bit value allocated as shown in Table A:

TABLE A

| Pixel Name | Pixel Data (2 bits/pixel) |
| --- | --- |
| Emphasis2 | 11 |
| Emphasis1 | 10 |
| Pattern Pixel | 01 |
| Background Pixel | 00 |

In one example, the PXD data may be separated into fields, such as a top field and a bottom field, that correspond to a top part and a bottom part of the sub-picture image in lines of the sub-picture. The PXD portion 204 may be formatted so that the PXD data defining the top field may follow the header and the PXD data defining the bottom field may follow the PXD defining the top field. Each line of the PXD data may be compressed using specific run length encoding ("RLE") compression.

The DCSQ 206 contains data that changes the attributes of the sub-picture display. The attributes may be specified as sub-picture commands ("SP commands") 208, 210 formatted to permit the sub-picture decoder to process the commands and configure the display as required by the commands. Table B shows a list of examples of SP commands and the attributes the commands operate on in order to configure the display. Those of ordinary skill in the art will appreciate that the information in Table B illustrates one example for implementing examples of commands for defining attributes of a sub-picture display. More commands or fewer commands may be used in a given implementation.

TABLE B

| Command name | Contents | Code | # of bytes in field |
| --- | --- | --- | --- |
| (1) FSTA_DSP | Forcefully sets display start timing of pixel data | 0x0 | 0 Bytes |
| (2) STA_DSP | Sets display start timing of pixel data | 0x1 | 0 Bytes |

TABLE B-continued

| Command name | Contents | Code | # of bytes in field |
|---|---|---|---|
| (3) STP_DSP | Sets display stop timing of pixel data | 0x2 | 0 Bytes |
| (4) SET_COLOR | Sets color code of pixel data | 0x3 | 2 Bytes |
| (5) SET_CONTR | Sets contrast between pixel data & main picture | 0x4 | 2 Bytes |
| (6) SET_DAREA | Sets display area of pixel data | 0x5 | 6 Bytes |
| (7) SET_DSPXA | Sets display start address of pixel data | 0x6 | 4 Bytes |
| (8) CHG_COLCON | Sets change of color and contrast for pixel data | 0x7 | PCD + 2B |
| (9) CMD_END | End of Display Control Command | 0xff | 0 Bytes |

FIG. 2 shows examples of SP commands 208, 210, which include the set color command 220 and the set contrast command 230. The set color command 220 sets the color of each pixel according to the corresponding pixel data. The set color command 220 includes a SET_COLOR command code 221, which is an 8-bit value shown in the example in TABLE B and in FIG. 2 as being '3.' Following the SET_COLOR command code 221 in the DCSQ is a 2-byte field that includes, in one byte, an emphasis2 color code 222 and an emphasis1 color code 224, and in the second byte, a pattern color code 226 and a background color code 228. Each color code is a 4-bit value for selecting from 16 sets of YUV choices coming from a YUV palette, which is a pre-configured set of data used to obtain intensity and color information for each pixel. An example YUV palette may be configured as described below with reference to the YUV formatter 105. The 2-bit value in the PXD data for a given pixel may be used as an index into the two-byte SET_COLOR command code 221 to select from four 4-bit color codes. The selected 4-bit color code value may then be used as an index into the YUV palette, which may be a table containing 16 YUV color choices.

The set color command 220 defines the starting color of each line. If the set color command 220 is not present in the DCSQ being processed, the colors of each pixel maintain the last SET_COLOR values set by the previously processed DCSQ in the sub-picture unit 200 being processed.

The set contrast command 230 sets the contrast ratio between each pixel of the decoded sub-picture and the main picture in a process known in the art as 'alpha-blending.' The set contrast command 230 includes a SET_CONTR command code 231, which is an 8-bit value shown in the example in TABLE B and FIG. 2 as being '4.' Following the SET_CONTR command code 231 in the DCSQ is a 2-byte field that includes, in one byte, an emphasis2 contrast code 232 and an emphasis1 contrast code 234, and in a second byte, a pattern contrast code 236 and a background contrast code 238. The SET_CONTR command may be performed using the following relationship:

Set Contrast Alpha-blended pixel intensity=main picture intensity*main picture ratio+sub-picture intensity*sub-picture ratio;

where,
Main picture ratio=(16−k)/16 Sub-picture ratio=k/16
When the code value is '0' k=code value
When the code value is not '0' k=code value+1

The code value above is the contrast code value 232-238 in FIG. 2 in the set contrast command 230 field in the DCSQ. The code value in this example is a four-bit value between 0 and 15. The value k is an integer value between 0 and 16.

If the SET_CONTR command is not present in the DCSQ being processed, the alpha-blending ratio maintains the last SET_CONTR values set by the previously processed DCSQ in the sub-picture unit 200 being processed. This command defines the starting contrast of each line.

Referring back to FIG. 1, once the stream parser 101 has parsed the DVD stream, the sub-picture unit 200 is decoded for display by the sub-picture decoder 104. In the example in FIG. 1, the sub-picture decoder 104 may decode the run length encoded pixel data to generate a sub-picture image. A RLC compression scheme permits compression of the bitmap data by specific run length compression rule. As described above, RLC permits runs of data, that is, consecutive instances of a data value, to be represented as a single data value and a run count rather than as the original string of data values in the run.

The pixel data ("PXD") may be decoded as described above in Table A in runs of PXD values for the top field followed by the bottom field continuously. Other arrangements are possible. With respect to the commands to set color and contrast, the PXD value in each line determines which code is used in executing the command. As shown in FIG. 2, the set color command 220 is followed by a two-byte field containing a code value specifying the particular color for each PXD type. In the two-byte fields, the colors are specified as four four-bit values to select from 16 sets of YUV choice. If the decoded PXD value for a given pixel is '00,' the background color code 228 is used for the background field for that pixel. If the PXD value is '01,' the pattern color code 226 is used. The emphasis1 color code 224 is used for a PXD value of '10' and the emphasis2 color code 222 is used for a PXD value of '11.' Similarly, as shown in FIG. 2, the set contrast command 230 is followed by a two-byte field containing a code value specifying the contrast for each PXD type. In the two-byte fields, the contrast is specified as four four-bit values specifying contrast for each PXD type. If the PXD value for a given pixel is '00,' the background contrast code 238 is used for the background field for that pixel. If the PXD value is '01,' the pattern contrast code 236 is used. The emphasis1 contrast code 234 is used for a PXD value of '10,' and the emphasis2 contrast code 232 is used for a PXD value of '11.'

Referring back to FIG. 1, after the sub-picture decoder 104 has decoded a sub-picture, the YUV formatter 105 may determine intensity and color parameters for each sub-picture pixel based on the pixel data and the control commands for each pixel. In one example, the YUV formatter 105 may determine the intensity and color parameters as Y, U and V values according to a YUV standard such as the YUV420 standard. The YUV formatter 105 may generate a pixel mapping of YUV values for each pixel in the sub-picture and store the YUV values in memory.

The YUV formatter 105 converts the pixel data to YUV values by initializing a YUV palette. The data for the YUV palette may be determined from a pre-configured set of data known in the art as, "Program Chain Sub-Picture Palette information." The Program Chain Sub-Picture Palette information may be stored in the DVD as a file known in the art as the program chain information ("PGCI") file. The PGCI file may include multiple selectable sets of data for initializing a YUV palette for a specific sub-picture image. The YUV palette may be initialized by selecting the YUV values from the Program Chain Sub-Picture Palette information data according to the specific sub-picture. An example YUV palette is shown below in Table C. It is noted that the numbers in the 'code value' column are in hexadecimal format as denoted by the '0x' prefix. The YUV intensity values are also in hexadecimal format and each contain three bytes arranged so that the first byte is a 'V' chroma value, the second byte is a 'U' chroma value, and the third byte is a 'Y' luma value.

TABLE C

| Code Value | YUV intensity (formatted as 0xVUY) |
|---|---|
| 0x0 | 0x6892B6 |
| 0x1 | 0x9E57A3 |
| 0x2 | 0x808010 |
| 0x3 | 0x8080EA |
| 0x4 | 0x8E7556 |
| 0x5 | 0x8080A9 |
| 0x6 | 0x977133 |
| 0x7 | 0x957132 |
| 0x8 | 0xC28F83 |
| 0x9 | 0x7B30CC |
| 0xA | 0xB66D30 |
| 0xB | 0x515B4F |
| 0xC | 0x9B44B9 |
| 0xD | 0xCFCF61 |
| 0xE | 0x7AA279 |
| 0xF | 0x8D38A2 |

The YUV formatter 105 may generate a YUV value for each pixel using the 2-bit pixel data value as an index into the 2-byte SET_COLOR code value 222, 224, 226, 228 in FIG. 2. In an example conversion for a given pixel, the sub-picture pixel data may be set to '01' with the two-byte color command code value set to 0xAF23. The pixel data is used as an index to the two-byte color command code value, which in this example is '0x2.' Using 0x2 as an index into the YUV palette in TABLE C, the YUV value for this pixel is determined to be 0x808010. The intensity, Y, value is thus 0x10, or 16; the 'U' chroma value is '0x80' and the 'V' chroma value is also '0x80.' The YUV formatter 105 may store the YUV values for each sub-picture pixel in memory.

The preprocessing function 106 may adjust the sub-picture intensity before the system performs the anti-aliasing filtering function 107. In an example method and system for processing a sub-picture, the preprocessing function 106 may be executed if, for a given pixel, the color code palette value of the first pixel type, which in this example is the background YUV palette value, is greater than the second pixel type color code YUV palette value, which in this example is the pattern YUV palette value. To reduce the render time, the Y, luma, palette value is compared in this case. If the first pixel type YUV color intensity is greater than the second pixel type YUV color intensity, the intensity value (Y) for the specified first pixel type is set to a suitably lower value (darker contrast) than the second pixel type value. In the example described above for a color command value of 0xAF23, the sub-picture pixel data may be set to '00,' which in this example is the background pixel type. The background intensity value using the YUV palette in Table C is '0xEA=234' using 0x3 in 0xAF23 as an index into the YUV palette table. Another pixel data value '01', which is a pattern pixel type, provides the YUV color intensity value of '0x10=16' using 0x2 in 0xAF23 as an index. Using the pixel data value of '00' indicating a background pixel type at the set contrast code value of 0xFFF0 as an index from the least significant four-bit part of the 16-bit value 0xFFF0, the code value may be set to k=0x0, or 0. Using the pixel data value of '01' indicating a pattern data at the set contrast code value of 0xFFF0 as an index from the least significant four-bit part of the 16-bit value 0xFFF0, the code value may be set to k=0xF, or 15. Since the background intensity value (0xEA) is greater than the pattern intensity value (0x10) for this sub-picture, the preprocessing function 106 sets the intensity in the YUV value to be used in the alpha-blending to a first contrast adjusted pixel intensity determined by performing the SET_CONTR command described above with k=0 and 15. In this alpha-blending as preprocessing, the main picture data value is always 0. Using these values in this example, the alpha-blended intensity at this pixel may be determined as follows:

$$\begin{aligned}\text{Alpha-blended\_pixel\_intensity} & \\ \text{at background} &= 0 \\ \text{`00' pixel with } k & \\ &= \text{main picture data} * \\ & \quad (16-k)/16 + \\ & \quad \text{sub-picture data} * (k/16) \\ &= 0 * (16-0)/16 + 234 * (0/16) \\ &= 0 + 0 \\ &= 0\end{aligned}$$

And $$\begin{aligned}\text{alpha-blended\_pixel\_intensity} & \\ \text{at background} &= 15 \\ \text{`01' pixel with } k & \\ &= \text{main picture data} * \\ & \quad (16-k)/16 + \\ & \quad \text{sub-picture data} * (k/16) \\ &= 0 * (16-(15+1))/16 + 16 * \\ & \quad ((15+1)/16) \\ &= 0 + 16 \\ &= 16\end{aligned}$$

The preprocessing function 106 may be applied prior to anti-aliasing filtering 107. Anti-aliasing is a technique used to minimize aliasing (jagged edges or blocky patterns) when representing high resolution information at a lower resolution. When a signal is sampled without removing the high-frequency information, a resulting waveform may include undesirable artifacts, such as jagged edges or blocky patterns.

Figure 3:
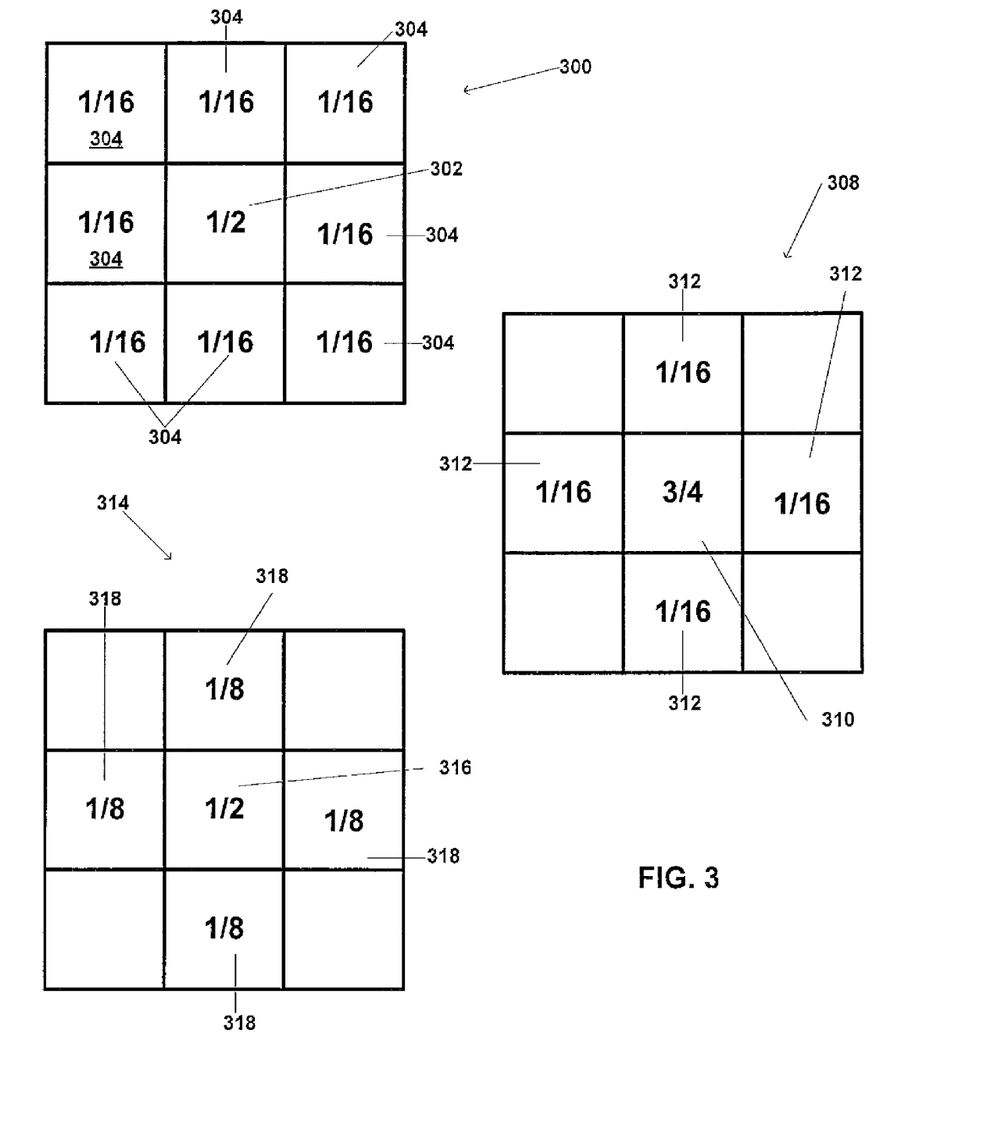
FIG. 3 illustrates example anti-aliasing filters that may be implemented in example systems and methods for processing a sub-picture image.

FIG. 3 illustrates example anti-aliasing filters that may be implemented in example systems and methods for processing a sub-picture image. One approach for anti-aliasing is, for each pixel, to use the average intensity of a rectangular area (with different weight) in a scene corresponding to the artifact information and apply the average intensity to the pixel data. In an example of one implementation, the weighting is applied to the intensity ('Y' or luma) information and not to the chroma ('U' and 'V') information to reduce the render time. In addition, the human visual system is less sensitive to UV, chroma, information compared to Y, luma information. Three two dimensional, anti-aliasing (low-pass) filters are depicted in FIG. 3. The anti-aliasing filtering function 107 in this example is applied to the YUV values for each sub-picture pixel after performing the preprocessing function 106.

FIG. 3 depicts a 9-pixels filter 300 in which a center pixel 302 has its intensity value multiplied by a weight of ½, each surrounding pixel 304 has its intensity value multiplied by a weight of 1/16 and the sum of the multiplied values is applied to the center pixel 302 as its new filtered intensity value. FIG. 3 also shows a first five pixels filter 308 in which a first five pixels filter center pixel 310 has its intensity value multiplied by a weight of ¾, each pixel directly to one side 312 has its intensity value multiplied by a weight of 1/16 and the sum of the multiplied values is applied to the center pixel 310 as its new filtered intensity value. FIG. 3 shows a second five pixels filter 314 in which a second five pixels filter center pixel 316 has its intensity value multiplied by a weight of ½, each pixel directly to one side 318 has its intensity value multiplied by a weight of ⅛ and the sum of the multiplied values is applied to the center pixel 316 as its new filtered intensity value. The weights of ¾, ½, ⅛ and 1/16 are chosen to do simple right shift data processing instead of using expensive division.

Referring back to FIG. 1, after the filtering function 107 performs anti-aliasing filtering on the YUV values, the sub-picture alpha-blending function 108 adjusts the contrast of the sub-picture pixel relative to the contrast setting of the corresponding pixel in the main picture video. The sub-picture alpha-blending function 108 receives main video image data from the video frame buffer 112 and the sub-picture pixel intensity value generated by the anti-aliasing filtering 107 to determine a combined main video-sub-picture pixel intensity. The combined pixel intensity may be determined using the SET_CONTR command described above.

To illustrate contrast adjustment in an example system, a main video pixel may be encoded so that its intensity, Y, value will be decoded by the video decoder 110 as being 100. The sub-picture video pixel at the same pixel location may have an intensity value of 234 given a pixel data value of '01' and a set contrast code value of 0xFFF0 from the DCSQ data. The decoded pixel data value before conversion to its YUV value with palette information is therefore set to a pattern contrast data type as indicated in Table A. Using the pixel data value of '01' indicating a pattern data at the set contrast code value of 0xFFF0 from the most significant four-bit part, the code value may be set to 0xF, or 15. Using these values in the relationship above, the alpha-blended intensity at this pixel may be determined as follows:

$$\text{Alpha-blended\_pixel\_intensity} = \text{main picture data} * (16-k)/16 + \text{sub-picture data} * (k/16)$$
$$= 100*(16-(15+1))/16 + 234*((15+1)/16)$$
$$= 0 + 234$$
$$= 234$$

In this example of alpha-blending, the pixel information is mixed such that it is formatted according to the YUV420 standard. The combined main video and sub-picture image data are then output to the Vport driver 114 for display. A function may also convert the YUV420 formatted pixel data of the combined image to RGB ("Red-Green-Blue") values prior to display.

Figure 4:
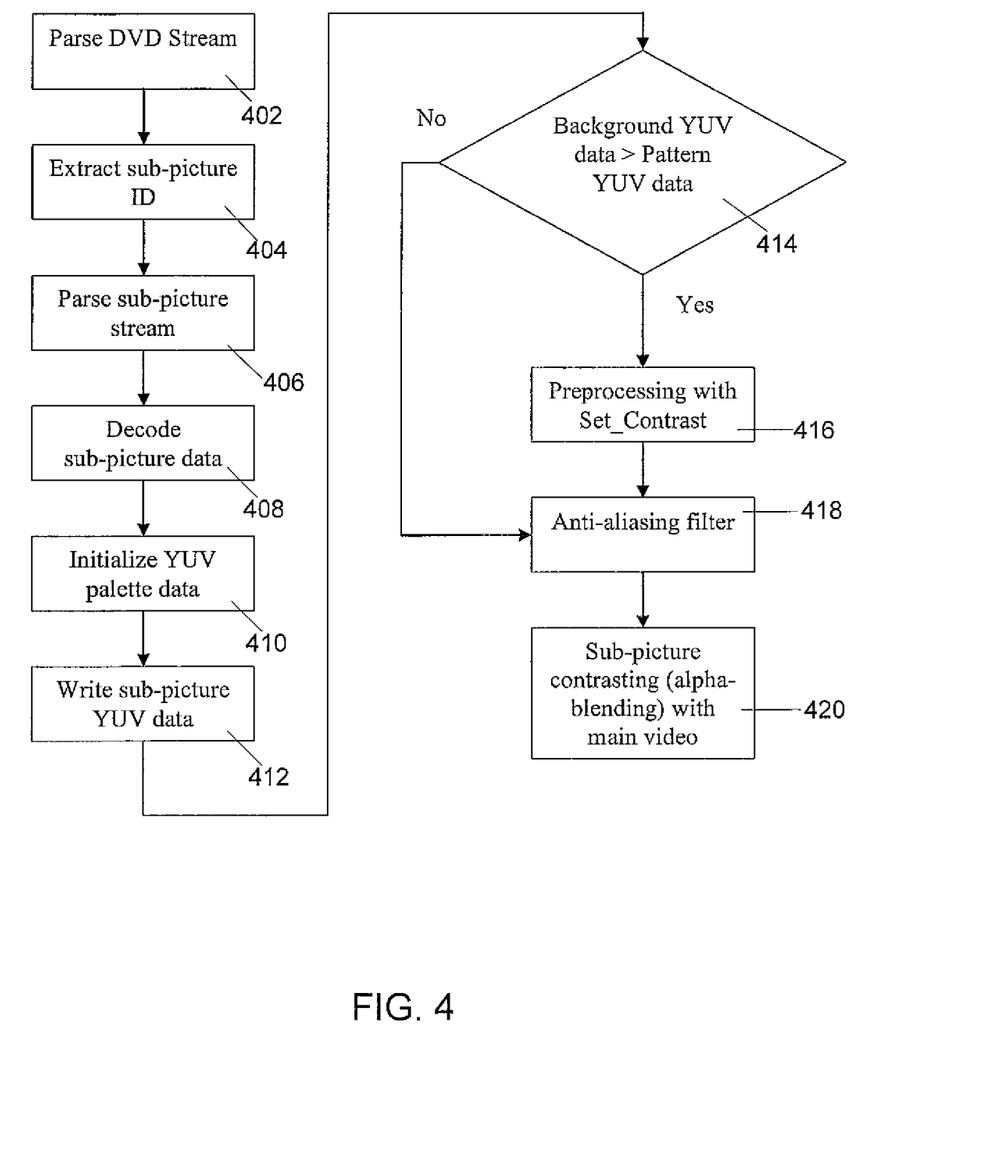
FIG. 4 is a flowchart depicting operation of an example method for processing a sub-picture image.

FIG. 4 is a flowchart depicting operation of an example method for processing a sub-picture image. The method parses the DVD video pack stream in step 402. In the parsing of the DVD video pack stream, the sub-picture ID is extracted and a sub-picture image bitmap and Display Control Sequence (DCSQ) data are retrieved from the DVD memory at step 404 and 406, respectively. At step 406, the encoded sub-picture pixel data (PXD) and DCSQ sequences may be stored and processed in buffers or memory that may be structured as described with reference to FIG. 2. At step 408, the sub-picture image data is decoded by sub-picture decoder 104 (See FIG. 1) generating the decoded sub-picture data as 2-bit per pixel codes as shown in Table A. The pixel data may be followed by a display control sequence containing the pixel control data including for example a set color command and a set contrast command. At step 410, the display control sequence is processed to determine YUV palette data that may be used for the display of the pixels in the sub-picture image. The YUV palette data may be determined by a Program Chain Sub-Picture Palette information that may be stored in DVD files. Table C is an example of initialized YUV palette data. Using the initialized YUV palette data generated at step 410, the decoded 2-bit per sub-picture pixel data are converted into YUV420 format data at step 412 to match the data format of the main picture.

The initialized YUV palette data may also be used to generate a background YUV data value, a pattern YUV data value, an emphasis1 YUV data value, and emphasis2 YUV data value based on the set color command code value 222, 224, 226, 228 in FIG. 2. The color code YUV data value, in this example background YUV data value, is checked against the neighboring color code value, which in this example is the pattern YUV data value at decision block 414. If the background YUV data value is greater than the pattern YUV data value, the decoded sub-picture YUV data is processed by the preprocessing function 106 (see FIG. 1) without main video pixel data as shown at step 416. Referring to the example described above, the pattern intensity value of 0x10, or 16, is less than the background intensity value of 0xEA, or 234, given a color code value of 0xAF23. The preprocessing function at step 416 sets the sub-picture intensity value of the background to '0' or a suitably low value. At step 418, anti-alias filtering is performed on the pixel data using filtering such as the examples described above with reference to FIG. 3. At step 420, the pixel data for the sub-picture image is alpha-blended with the main video image data. One example of alpha-blending may be performed as described above for the alpha-blending function 108 in FIG. 1.

Figure 5:
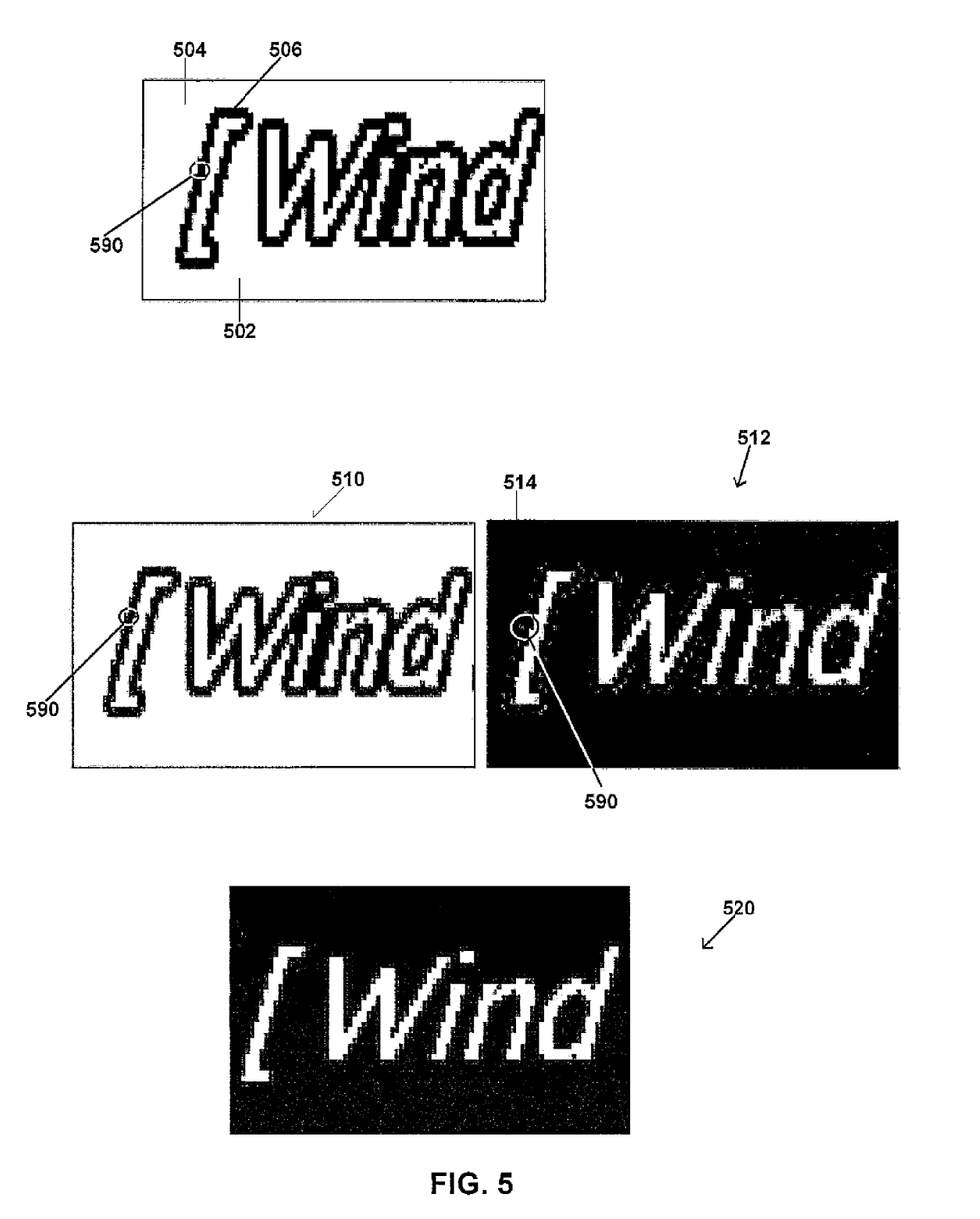
FIG. 5 includes example displays of sub-picture images illustrating operation of example systems and methods for processing a sub-picture image.

FIG. 5 includes example displays of sub-picture images illustrating operation of example systems and methods for processing a sub-picture image. A first image 502 is an example display image of sub-picture image data displayed after it has been decoded, such as by sub-picture decoder 104 in FIG. 1, but without filtering and alpha-blending. The first image 502 includes light-colored (i.e. white) background pixels 504 and dark-colored (i.e. black) pattern pixels 506 that have not been processed by anti-aliasing filtering and by blending with the main video image. A second image 510 in FIG. 5 illustrates appearance of the image after the sub-picture image pixels have been filtered, such as by an anti-aliasing filter, without preprocessing. A third image 512 illustrates a sub-picture image that has been alpha-blended with a main video image, which provides darker background pixels 514. The third image 512 depicts an example in which the background YUV data value is greater than the pattern YUV data value and its anti-aliasing filtered sub-picture produces undesired artifacts in the area near the transition from background to pattern pixels after alpha-blending the sub-picture and the main picture data. In some cases, the background YUV data value is smaller than the pattern YUV data value. In this case, the preprocessing of the decoded sub-picture data is not performed and only the anti-aliasing filtering is required.

A fourth image in FIG. 5 depicts a display 520 of a sub-picture that has been alpha-blended with a main video image after performing an example of the preprocessing function 106 and the anti-aliasing filtering function 107 as described above with reference to FIGS. 1 and 4.

Figure 6:
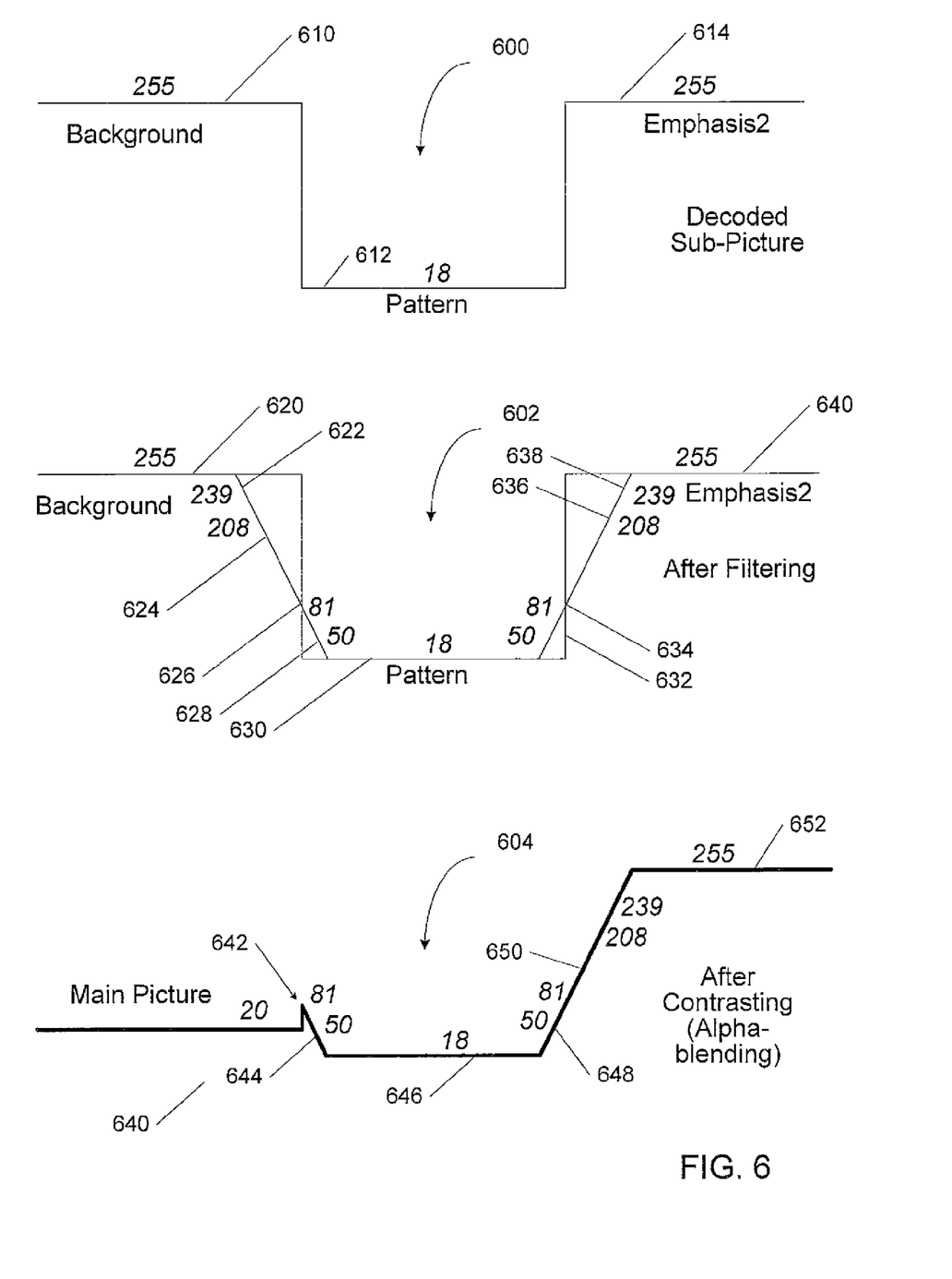
FIG. 6 shows waveforms illustrating operation of example systems and methods for processing a sub-picture image.
Figure 7:
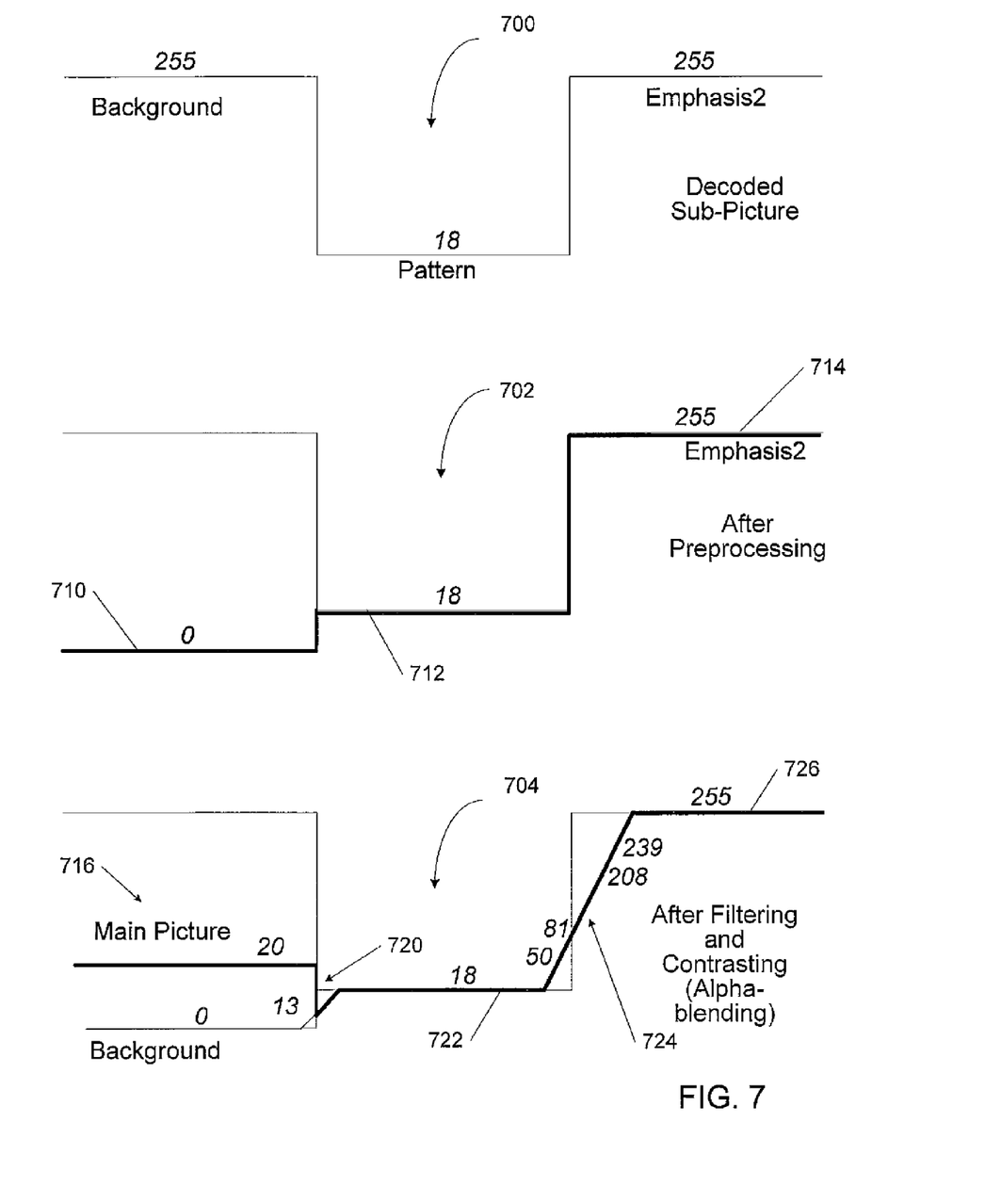
FIG. 7 shows more waveforms illustrating operation of example systems and methods for processing a sub-picture image.

FIGS. 6 and 7 depict waveforms illustrating operation of example systems and methods for processing a sub-picture image. FIG. 6 shows three waveforms that illustrate how the displays in FIG. 5 are generated by plotting displayed RGB values for pixels at the transition between the white background and the black pattern. The transition is at a line outlining a character in the sub-picture. For example, the waveforms may show the changes in pixel intensity at 590 between the background, line and interior area of the line forming the parenthesis character in displays 502, 510, 512 and 520.

The first waveform 600 illustrates RGB values for an example of a line of a character, as described above, in a sub-picture image formed by decoded image data without preprocessing contrast adjustment or anti-aliasing filtering. The first waveform 600 shows the RGB values set to 255 (brightest level) at 610 for the background transitioning to a dark level of 18 at the pattern at 612, which forms the line outlining the character. The RGB value then transitions to the brightest level of 255 in the interior area of the character defined by the emphasis2 pixel data at 614.

The second waveform 602 illustrates RGB values for the line part of a character where the sub-picture pixels have been processed by anti-aliasing. In the second waveform 602, the background level is at the brightest level of 255 at 620 and as a result of anti-aliasing filtering, transitions gradually, first to a level of 239 at 622, then to a level of 208 at 624, to a level of 81 at 626, a level of 50 at 628 and to a level of 18 at the pattern at 630. The RGB values then transition gradually from the pattern level to the emphasis2 level, first at a level of 50 at 632, a level of 81 at 634, a level of 208 at 636, a level of 239 at 638 and the brightest level of 255 at 640. The RGB values may be the result of application of one of the anti-aliasing filters described above with reference to FIG. 3.

The third waveform at 604 illustrates an image of a combined sub-picture and main video image, which means the image has been alpha-blended, without performing the preprocessing contrast adjustment function on the sub-picture image data. The third waveform 604 is formed of displayed RGB values in the background at 640 that are combined with the main video pixel levels, which in the example of FIG. 6 is the relatively dark level of 20 (a level of 0 being the darkest). The RGB level transitions up to 81 at 642 then down to a level of 50 at 644 before reaching the level of 18 in the pattern at 646. The transition up to 81 from 20 between the background and the pattern results from the contrast adjustment during alpha-blending when the sub-picture is combined with the main picture. This transition up to 81 from 20 at 642 appears as a "blip" causing the undesired artifact as shown in the third image 512 of FIG. 5. At the pattern, the RGB values transition gradually from the pattern level to the emphasis2 level, first at a level of 50 at 648, then to a level of 81 at 650, and gradually up to the brightest level of 255 at 652.

The RGB values in the third waveform 604 are for a combined sub-picture image and main video image without having performed a preprocessing with contrast adjustment as described above with reference to FIGS. 1 and 4. FIG. 7 includes first, second and third waveforms 700, 702, 704 depicting operation of an example system for processing sub-picture image data in which the preprocessing with contrast adjustment, the anti-aliasing filtering and alpha-blending with main picture are performed on the sub-picture image data. The first waveform 700 in FIG. 7 depicts display of an image of the sub-picture image data after having been decoded by a decoder such as the sub-picture decoder 104 in FIG. 1. The second waveform 702 depicts RGB values after the sub-picture image data has been preprocessed with contrast adjustment. In the second waveform 702, the background RGB value is set to 0, the darkest level, at 710. The background RGB value in the second waveform 702 is set during the preprocessing with contrast adjustment of the sub-picture image. In this case the background contrast value, k, is 0, the emphasis2 contrast value 15, the pattern contrast value 15 and no emphasis1 contrast value. Therefore, its alpha-blending without main video data makes the sub-picture data value in background is 0 and other pixel data do not change. The RGB value then transitions to 18 at the pattern pixels at 712, and then to the dark levels of 255 at the emphasis2 pixels at 714.

The preprocessed sub-picture image data is then processed by anti-aliasing filtering and then combined with the main picture data. Using the anti-aliased filtering of pixel data, the displayed RGB value transitions gradually from the background to pattern, first at a level of 0 at 716, a level of 13 at the edge of background and pattern, a level of 18 at 720. The third waveform 704 in FIG. 7 shows RGB values of the sub-picture after combining with the main picture RGB values. The background pixel RGB of 20 at 716 results from alpha-blending with contrast adjustment (in this case background k=0) of main picture pixel value 20 and the sub-picture background pixel value 0. The background pixel RGB value at 716 becomes 20 as shown in FIG. 7, pursuant to preprocessing with contrast adjustment, anti-aliasing filtering and alpha-blending as described above with reference to FIG. 1. The sub-picture image data is processed by anti-aliasing filtering, but in transitioning to the pattern level, the RGB value transitions to a darker level of 18 at 720 than the main picture level 20. Note that the final RGB value transitions from the background to pattern, first at a level of 20 at 716, a level of 13 at the edge of background and pattern, a level of 18 at 722, not only eliminating the undesired anti-aliasing filtering artifacts and with smoothing edges but also achieving sharp negative edge detail enhancement between the background and pattern pixels. By having set the contrast of the background pixels to a lower level than the contrast level for the pattern pixels, the transition at alpha-blending in the anti-aliasing zone at 720 is made without reaching a high level that would create the artifacts described above with reference to FIG. 5. At the pattern pixels at 722, the RGB value is at 18. The RGB level transitions up along 724 to the emphasis2 RGB level at 726, which is at the highest level of 255. The image 520 in FIG. 5 illustrates a final combined (second alpha-blending) image of sub-picture and main picture after preprocessing (first alpha-blending) and anti-aliased filtering. In this sub-picture decoding method, the alpha-blending with SET_CONTR data is used twice in case of the background YUV data value is greater than the neighboring data value, in this example the pattern YUV data value. The first alpha-blending in preprocessing is performed with decoded sub-picture data only, without main picture pixel data. The second alpha-blending involves the filtered sub-picture and main picture pixel data.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1 & 7 may be performed by hardware and/or software. Additionally, a system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

The invention claimed is:

1. A computer implemented system for processing video images for display comprising:
   at least one processor in communication with an associated non-transitory computer readable memory of the computer-implemented system with the computer-implemented system further comprising:
   a stream parser for retrieving a main video and a sub-picture identifier;
   a video decoder to generate a main video image having a main video intensity value for each pixel in the main video;
   a sub-picture decoder to determine a sub-picture image based on the sub-picture identifier, the sub-picture image having pixel data for each pixel in the sub-picture image, the pixel data being indicative of a sub-picture pixel type including at least a first pixel type and a second pixel type, each pixel further having a command code indicative of a pixel type contrast level corresponding to each pixel type and a pixel type color intensity corresponding to each pixel type;
   an intensity formatter to generate a sub-picture pixel intensity for each pixel in the sub-picture image;
   a preprocessing function to calculate, for each sub-picture pixel, an adjusted sub-picture intensity level by performing a set contrast command with no main video image data when the first pixel type color intensity is greater than the second pixel type color intensity
   a filtering function to perform anti-aliasing filtering on the sub-picture image; and a sub-picture set contrast command function to combine the sub-picture image with the main video image.

2. The system of claim 1 where the first pixel type is a background pixel type and the second pixel type is a pixel type selected from the group consisting of a pattern pixel type, an emphasis 1 pixel type and an emphasis 2 pixel type.

3. The system of claim 2 where the pixel data are coded using Run-Length Coding (RLC) followed by a display control sequence table (DSCQT) containing the sub-picture command codes, and where the sub-picture decoder decodes the RLC coding to generate a stream of pixel data and a set of sub-picture control commands including the command codes.

4. The system of claim 3 where the command codes are arranged as two-byte values including a four-bit portion for the color command code and a four-bit portion for the contrast command code.

5. The system of claim 3 where the intensity formatter determines an intensity value for each sub-picture pixel using the pixel data is used to select one of the four-bit portions of the color command code to use in a intensity-color palette to retrieve an intensity-color value for each sub-picture pixel, the intensity-color value including the intensity value for the sub-picture pixel.

6. The system of claim 1 where the intensity formatter is a YUV formatter to format the sub-picture pixels to a YUV-based format including a YUV420 format.

7. The system of claim 1 where the preprocessing function determines a sub-picture intensity level with the low contrast level using the following:

$$\text{sub-picture intensity level} = \text{sub-picture intensity} * \text{sub-picture ratio};$$

where, sub-picture ratio=k/16; and k=contrast command code value when the contrast command code value is '0;' and k=contrast command code value+1, when the contrast command code value is not '0.'

8. The system of claim 1 where the sub-picture alpha-blending function combines the sub-picture image with the main video image by calculating an alpha-blended intensity using the following:

$$\text{alpha-blended pixel intensity} = \text{main picture intensity} * \text{main picture ratio} + \text{sub-picture intensity} * \text{sub-picture ratio};$$

where, main picture ratio=(16−k)/16 and sub-picture ratio=k/16; and k=contrast command code value when the contrast command code value is '0;' and k=contrast command code value+1, when the contrast command code value is not '0.'

9. A computer implemented method for processing a sub-picture image comprising:
   providing a video images processing system having at least one processor in communication with an associated non-transitory computer readable memory, the video images processing system configured for:
   generating a main video image;

decoding a selected sub-picture image having a pixel data and a sub-picture display control command for each sub-picture pixel, the pixel data being indicative of a sub-picture pixel type including a first pixel type, and a second pixel type;

generating a sub-picture intensity value for each pixel using the pixel data and the display control command;

for each sub-picture pixel, performing a preprocessing function including:

calculating a first pixel type color intensity using a first pixel type color code and a second pixel type color intensity using a second pixel type color code of the sub-picture pixel;

comparing the first pixel type color intensity with the second pixel type color intensity;

if the first pixel type color intensity is greater than the second pixel type color intensity, performing a set contrast function on the sub-picture image data with no main video image data;

anti-aliasing filtering each sub-picture pixel; and combining the sub-picture image data with the main video image data using the set contrast command function.

10. The method of claim 9 further comprising:
decoding the sub-picture image by run-length decoding to generate the pixel data followed by a display control sequence table (DSCQT) containing the sub-picture display control command.

11. The method of claim 10 further comprising:
formatting the sub-picture display control command to include command codes arranged as two-byte values including a four-bit portion for the color command code and a four-bit portion for the contrast command code.

12. The method of claim 11 further comprising using the pixel data as a 2-bit code indicative of a selection of a background, a pattern, an emphasis1 and an emphasis2 pixel type for indexing into the two-byte command code values.

13. The method of claim 12 further comprising:
determining an intensity value for each sub-picture pixel using the pixel data to select one of the four-bit portions of the color command code;

using the selected four-bit portion in an intensity-color palette to retrieve an intensity-color value for each sub-picture pixel, the intensity-color value including the intensity value for the sub-picture pixel.

14. The method of claim 9 where step of generating a sub-picture intensity value for each pixel includes determining a YUV format including a YUV420 format.

15. The method of claim 9 where the step of performing the alpha-blending function on the sub-picture image includes determining the sub-picture intensity level using:

$$\text{sub-picture intensity level} = \text{sub-picture intensity} \ast \text{sub-picture ratio};$$

where, sub-picture ratio=k/16; and k=contrast command code value when the contrast command code value is '0;' and k=contrast command code value+1, when the contrast command code value is not '0.'

16. The method of claim 9 where the step of combining the sub-picture image data with the main video image data using alpha-blending comprises:

combining the sub-picture image with the main video image by calculating an alpha-blended intensity using the following:

$$\text{alpha-blended pixel intensity} = \text{main picture intensity} \ast \text{main picture ratio} + \text{sub-picture intensity} \ast \text{sub-picture ratio};$$

where, main picture ratio=(16−k)/16 and sub-picture ratio=k/16; and k=contrast command code value when the contrast command code value is '0;' and k=contrast command code value+1, when the contrast command code value is not '0.'

* * * * *